US008479616B2

(12) United States Patent
Tsai

(10) Patent No.: US 8,479,616 B2
(45) Date of Patent: Jul. 9, 2013

(54) MAGNETIC DRIVING DEVICE

(75) Inventor: Ching-Hui Tsai, Xianxi Township, Changhua County (TW)

(73) Assignee: Meng Rui Co., Ltd., Changhua County (TW)

( * ) Notice: Subject to any disclaimer, the term of this patent is extended or adjusted under 35 U.S.C. 154(b) by 299 days.

(21) Appl. No.: 12/763,397

(22) Filed: Apr. 20, 2010

(65) Prior Publication Data

US 2011/0209588 A1 Sep. 1, 2011

(30) Foreign Application Priority Data

Feb. 26, 2010 (TW) ................................ 99203580 U

(51) Int. Cl.

| | |
|---|---|
| ***B25B 13/00*** | (2006.01) |
| ***B25B 23/16*** | (2006.01) |
| ***B25B 13/02*** | (2006.01) |
| ***B25B 23/08*** | (2006.01) |
| ***B25B 23/10*** | (2006.01) |
| ***B25B 23/00*** | (2006.01) |
| ***B25G 1/00*** | (2006.01) |
| ***B25G 3/02*** | (2006.01) |
| ***B23B 31/28*** | (2006.01) |
| ***B23B 31/06*** | (2006.01) |
| ***B23B 31/07*** | (2006.01) |
| ***B23B 31/16*** | (2006.01) |
| ***B23B 31/12*** | (2006.01) |

(52) U.S. Cl.

USPC .......... 81/125; 81/124.2; 81/124.3; 81/124.4; 81/177.85; 81/173; 81/28; 81/52; 81/109; 81/121.1; 81/448; 81/451; 81/442; 81/438; 279/128; 279/155; 279/74; 279/75; 279/82

(58) Field of Classification Search

USPC .................. 81/125, 440, 442, 458, 438, 173, 81/28, 52, 109, 121.1–124.4, 177, 448, 451; 279/74, 75, 82, 128, 155

See application file for complete search history.

(56) References Cited

U.S. PATENT DOCUMENTS

| | | | | |
|---|---|---|---|---|
| 2,630,036 | A * | 3/1953 | Brown | 81/125 |
| 6,098,226 | A * | 8/2000 | Lin | 7/165 |
| 2008/0072718 | A1* | 3/2008 | Liu | 81/438 |
| 2009/0139378 | A1* | 6/2009 | Chiang et al. | 81/438 |

FOREIGN PATENT DOCUMENTS

| | | |
|---|---|---|
| TW | 96205701 | 2/2008 |

* cited by examiner

*Primary Examiner* — Monica Carter
*Assistant Examiner* — Danny Hong
(74) *Attorney, Agent, or Firm* — Raymond Y. Chan; David and Raymond Patent Firm

(57) ABSTRACT

A driving device includes a driving shank, a magnetic member mounted in the driving shank, a stop ring secured in the driving shank to stop the magnetic member, and an elastic member biased between the driving shank and the magnetic member. The driving shank has a first end provided with a mounting post and a second end formed with a mounting hole and a receiving chamber. The stop ring has an inner wall formed with a through hole and an outer wall provided with a toothed portion engaging a peripheral wall of the receiving chamber. The magnetic member has a peripheral wall formed with a stop flange that is movable to abut the stop ring. Thus, the elastic member provides a buffering effect to the magnetic member to reduce the pressure applied on the magnetic member.

4 Claims, 11 Drawing Sheets

MAGNETIC DRIVING DEVICE

BACKGROUND OF THE INVENTION

1. Field of the Invention

The present invention relates to a screw driving device and, more particularly, to a magnetic screw driving device that co-operates with a driving tool, such as a motorized tool, pneumatic tool or hand tool, for driving screws, screwdriver tips, drill bits or the like.

2. Description of the Related Art

A conventional driving device in accordance with the prior art shown in FIG. 8 comprises a driving shank 40 having a first end provided with a non-circular mounting post 43 and a second end formed with a non-circular mounting hole 41, and a magnetic member 42 secured in a bottom wall of the mounting hole 41 and extended into the mounting hole 41. When in use, the mounting post of the driving shank 40 is mounted on a driving tool, such as a motorized tool, pneumatic tool or hand tool, and the mounting hole 41 of the driving shank 40 is mounted on a driving member, such as a screwdriver tip, a drill bit and the like. At this time, the driving member is magnetically attracted by the magnetic member 42 so that the driving member is secured in the mounting hole 41 of the driving shank 40 exactly. Thus, the driving member is driven and operated by the driving tool. However, when the driving member is pushed backward due to an reaction, the driving member applies a pressure on the magnetic member 42 so that the magnetic member 42 is easily broken.

Another conventional driving device 50 in accordance with the prior art shown in FIGS. 9 and 10 comprises a socket 51 having a first end formed with a through hole 52, a second end formed with a non-circular mounting hole 53 and a mediate portion provided with a stop shoulder 54, a non-circular mounting post 56 secured in the through hole 52 of the socket 51, a magnetic member 55 movably mounted in the socket 51 and having a first end formed with a stop flange 551 received in the through hole 52 of the socket 51 and abutting the stop shoulder 54 of the socket 51 and a second end provided with a magnetic portion 554 extended into the mounting hole 53 of the socket 51, and an elastic member 553 received in the through hole 52 of the socket 51 and biased between the magnetic member 55 and the mounting post 56. The first end of the magnetic member 55 is formed with a receiving space 552 to receive the elastic member 553. Thus, when the driving member is pushed backward due to an reaction, the magnetic member 55 is pushed by the driving member to retract into the through hole 52 of the socket 51 and to compress the elastic member 553. Thus, the elastic member 553 provides a buffering effect to the magnetic member 55 to reduce the pressure applied on the magnetic member 55 so as to protect the magnetic member 55. However, it is difficult to form the stop shoulder 54 in the socket 51, thereby complicating the working process, and thereby increasing the cost of fabrication.

Another conventional driving device in accordance with the prior art shown in FIG. 11 comprises a driving shank 60, a magnetic member 63 movably mounted in the driving shank 60, a stop ring 66 secured in the driving shank 60 to stop the magnetic member 63, and an elastic member 64 mounted in the driving shank 60 and biased between the driving shank 60 and the magnetic member 63 to push the magnetic member 63 toward the stop ring 66. The driving shank 60 has a first end provided with a non-circular mounting post 66 and a second end formed with a non-circular mounting hole 61 and a receiving chamber 62 connected to the mounting hole 61. The receiving chamber 62 of the driving shank 60 has a peripheral wall formed with a retaining groove 65. The stop ring 66 is snapped into and secured in the retaining groove 65 of the driving shank 60 The magnetic member 63 is movably mounted in the receiving chamber 62 of the driving shank 60 and has a first end formed with a receiving space 68 to receive the elastic member 64 and a second end provided with a magnetic portion 69 extended into the mounting hole 61 of the driving shank 60. The magnetic member 63 has a peripheral wall formed with a stop flange 67 abutting the stop ring 66. Thus, the elastic member 64 provides a buffering effect to the magnetic member 63 to reduce the pressure applied on the magnetic member 63 so as to protect the magnetic member 63. However, it is difficult to form the retaining groove 65 in the receiving chamber 62 of the driving shank 60, thereby complicating the working process, and thereby increasing the cost of fabrication. In addition, the retaining groove 65 reduces the wall thickness of the receiving chamber 62 of the driving shank 60 to decrease the strength of the driving shank 60 so that the driving shank 60 is easily broken from the retaining groove 65.

BRIEF SUMMARY OF THE INVENTION

In accordance with the present invention, there is provided a driving device, comprising a driving shank, a magnetic member movably mounted in the driving shank, a stop ring secured in the driving shank to stop the magnetic member, and an elastic member mounted in the driving shank and biased between the driving shank and the magnetic member to push the magnetic member toward the stop ring.

The driving shank has a first end provided with a non-circular mounting post and a second end formed with a non-circular mounting hole and a receiving chamber connected to the mounting hole. The receiving chamber of the driving shank has a size smaller than that of the mounting hole of the driving shank. The stop ring is secured in the receiving chamber of the driving shank and has an inner wall formed with a through hole and an outer wall provided with a toothed portion engaging a peripheral wall of the receiving chamber of the driving shank. The toothed portion of the stop ring has a size greater than that of the receiving chamber of the driving shank so that the toothed portion of the stop ring is forcibly fitted into the peripheral wall of the receiving chamber of the driving shank. The magnetic member is movably mounted in the receiving chamber of the driving shank and has a first end formed with a receiving space connected to the receiving chamber of the driving shank and a second end provided with a magnetic portion extended into the mounting hole of the driving shank. The magnetic member has a peripheral wall formed with a stepped stop flange that is movable to abut the stop ring. The stop flange of the magnetic member has a size greater than that of the through hole of the stop ring. The stop flange of the magnetic member is movably mounted in the receiving chamber of the driving shank and is limited between the stop ring and the receiving chamber of the driving shank. The elastic member is partially received in the receiving chamber of the driving shank and partially received in the receiving space of the magnetic member.

The primary objective of the present invention is to provide a driving device having a magnetically attractive function.

According to the primary objective of the present invention, the elastic member provides a buffering effect to the magnetic member to reduce the pressure applied on the magnetic member so as to protect the magnetic member during operation of the driving shank.

According to another objective of the present invention, the driving shank is formed with a receiving chamber, and the stop ring is formed with a toothed portion engaging the peripheral wall of the receiving chamber of the driving shank so that the driving shank and the stop ring are worked easily and quickly to increase the productivity and to decrease the cost of fabrication.

According to a further objective of the present invention, the receiving chamber of the driving shank has a constant diameter without breaking the whole strength of the driving shank so that the driving shank has a greater structural strength.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
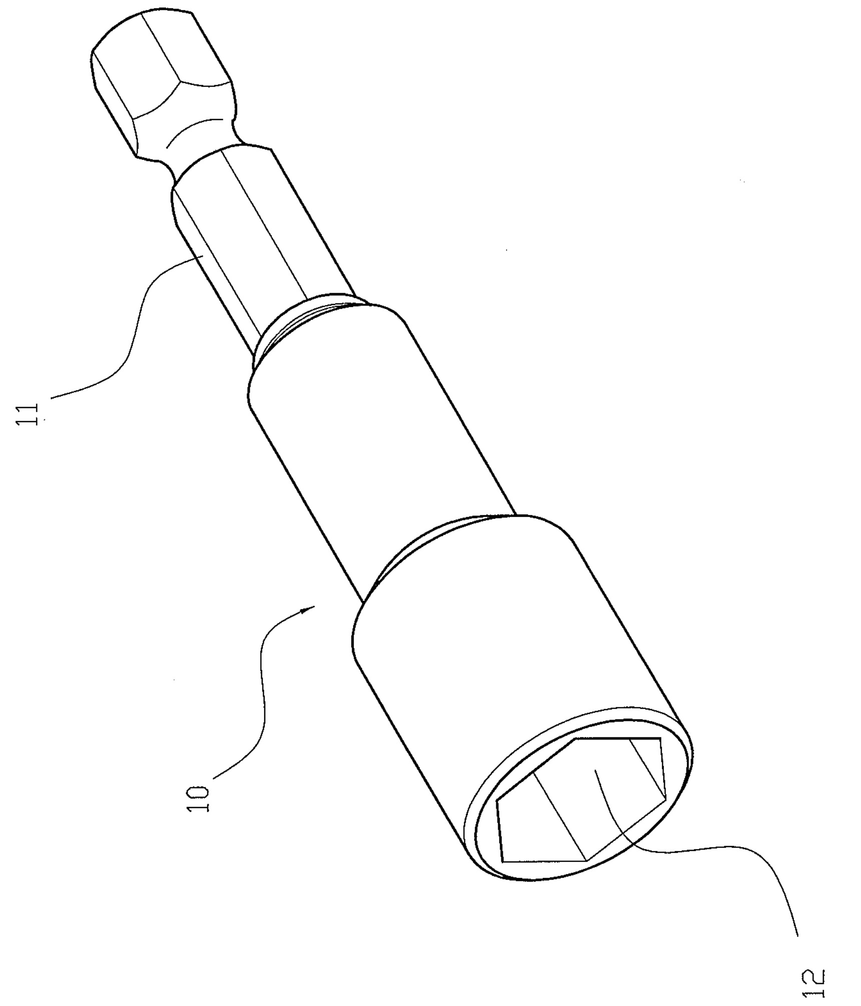
FIG. 1 is a perspective view of a driving device in accordance with the preferred embodiment of the present invention.
Figure 2:
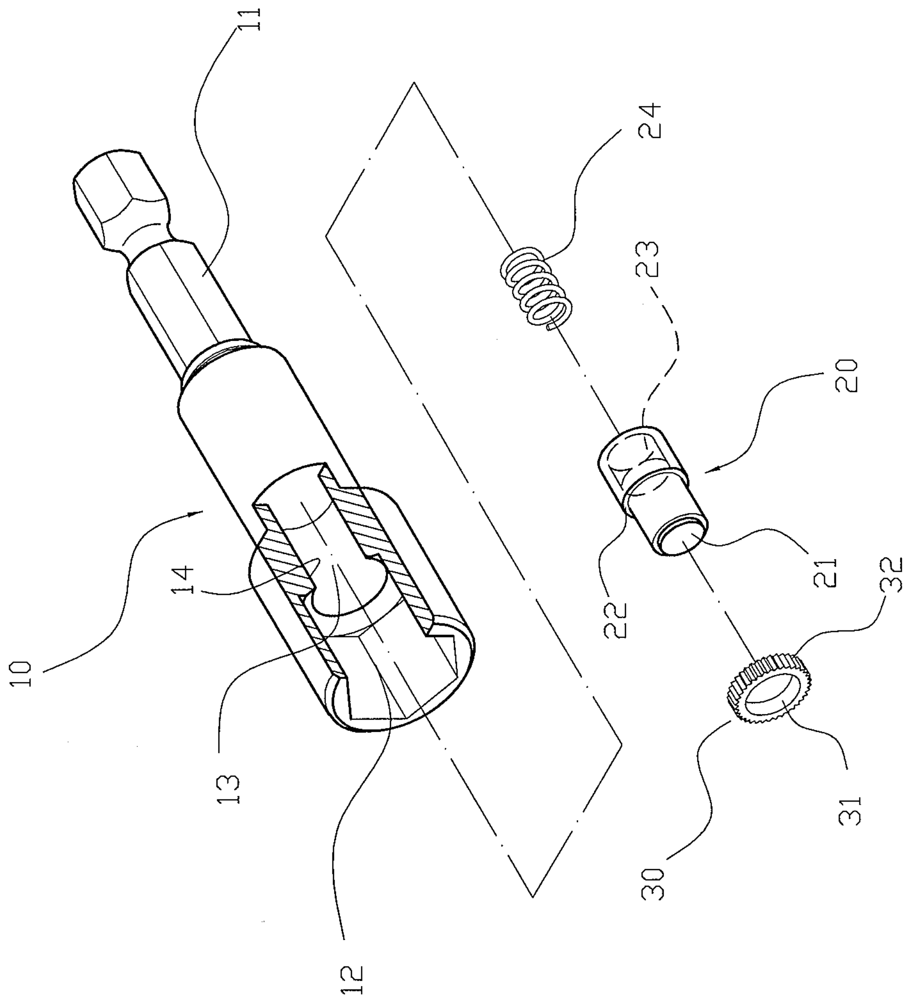
FIG. 2 is an exploded perspective view of the driving device as shown in FIG. 1.
Figure 3:
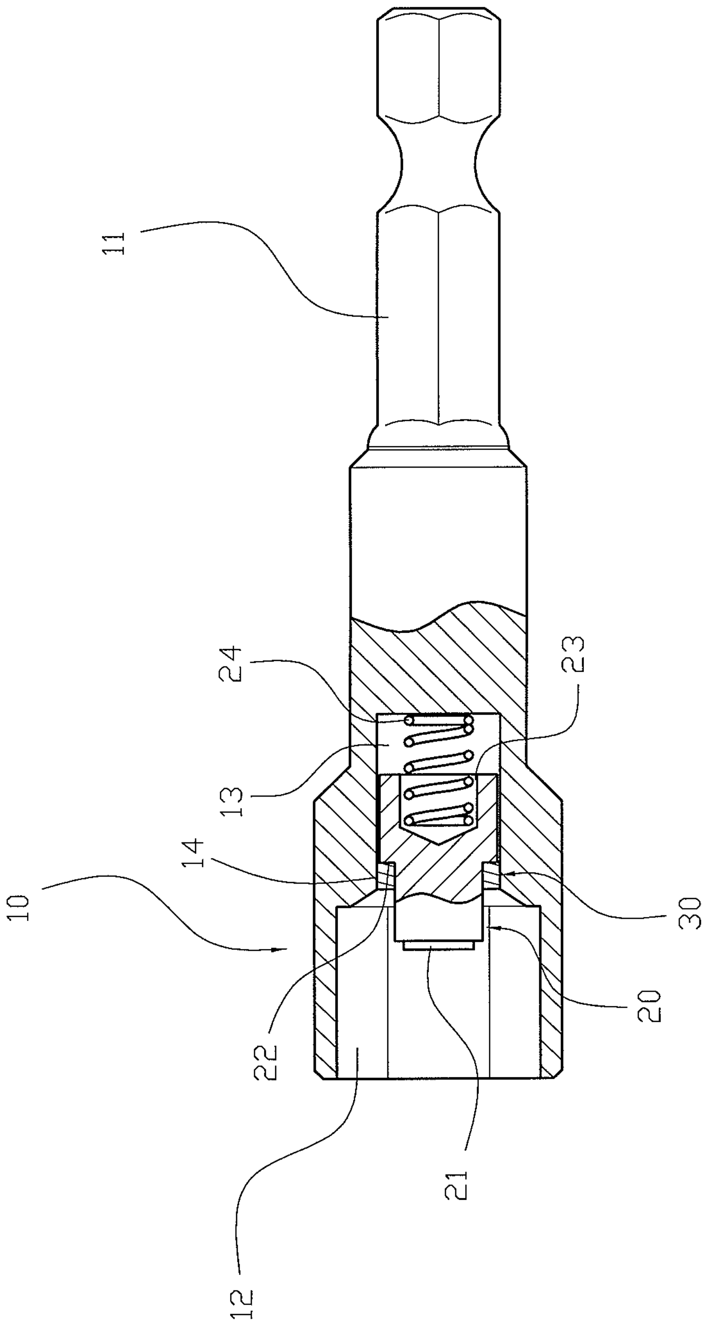
FIG. 3 is a front cross-sectional view of the driving device as shown in FIG. 1.

Referring to the drawings and initially to FIGS. 1-3, a driving device in accordance with the preferred embodiment of the present invention comprises a driving shank 10, a magnetic member 20 movably mounted in the driving shank 10, a stop ring 30 secured in the driving shank 10 to stop the magnetic member 20, and an elastic member 24 mounted in the driving shank 10 and biased between the driving shank 10 and the magnetic member 20 to push the magnetic member 20 toward the stop ring 30.

The driving shank 10 has a first end provided with a non-circular mounting post 11 and a second end formed with a non-circular mounting hole 12 and a receiving chamber 13 connected to the mounting hole 12. The receiving chamber 13 of the driving shank 10 has a circular shape and has a size smaller than that of the mounting hole 12 of the driving shank 10. The receiving chamber 13 of the driving shank 10 is located between the mounting hole 12 and the mounting post 11 of the driving shank 10.

The stop ring 30 is secured in the receiving chamber 13 of the driving shank 10 and has an inner wall formed with a through hole 31 and an outer wall provided with a toothed portion 32 engaging a peripheral wall 14 of the receiving chamber 13 of the driving shank 10. The toothed portion 32 of the stop ring 30 has a size slightly greater than that of the receiving chamber 13 of the driving shank 10 so that the toothed portion 32 of the stop ring 30 is forcibly fitted into the peripheral wall 14 of the receiving chamber 13 of the driving shank 10.

The magnetic member 20 is movably mounted in the receiving chamber 13 of the driving shank 10 and has a first end formed with a receiving space 23 connected to the receiving chamber 13 of the driving shank 10 and a second end provided with a magnetic portion 21 extended into the mounting hole 12 of the driving shank 10. The first end of the magnetic member 20 is movably mounted in the receiving chamber 13 of the driving shank 10 and has a size greater than that of the second end of the magnetic member 20. The second end of the magnetic member 20 is movably mounted in the through hole 31 of the stop ring 30 and is extended into the mounting hole 12 of the driving shank 10. The magnetic member 20 has a peripheral wall formed with a stepped stop flange 22 that is movable to abut the stop ring 30. The stop flange 22 of the magnetic member 20 is located between the receiving space 23 and the magnetic portion 21 of the magnetic member 20 and has a size greater than that of the through hole 31 of the stop ring 30. The stop flange 22 of the magnetic member 20 is movably mounted in the receiving chamber 13 of the driving shank 10 and is limited between the stop ring 30 and the receiving chamber 13 of the driving shank 10.

The elastic member 24 is partially received in the receiving chamber 13 of the driving shank 10 and partially received in the receiving space 23 of the magnetic member 20. The elastic member 24 pushes the stop flange 22 of the magnetic member 20 toward the stop ring 30.

Figure 4:
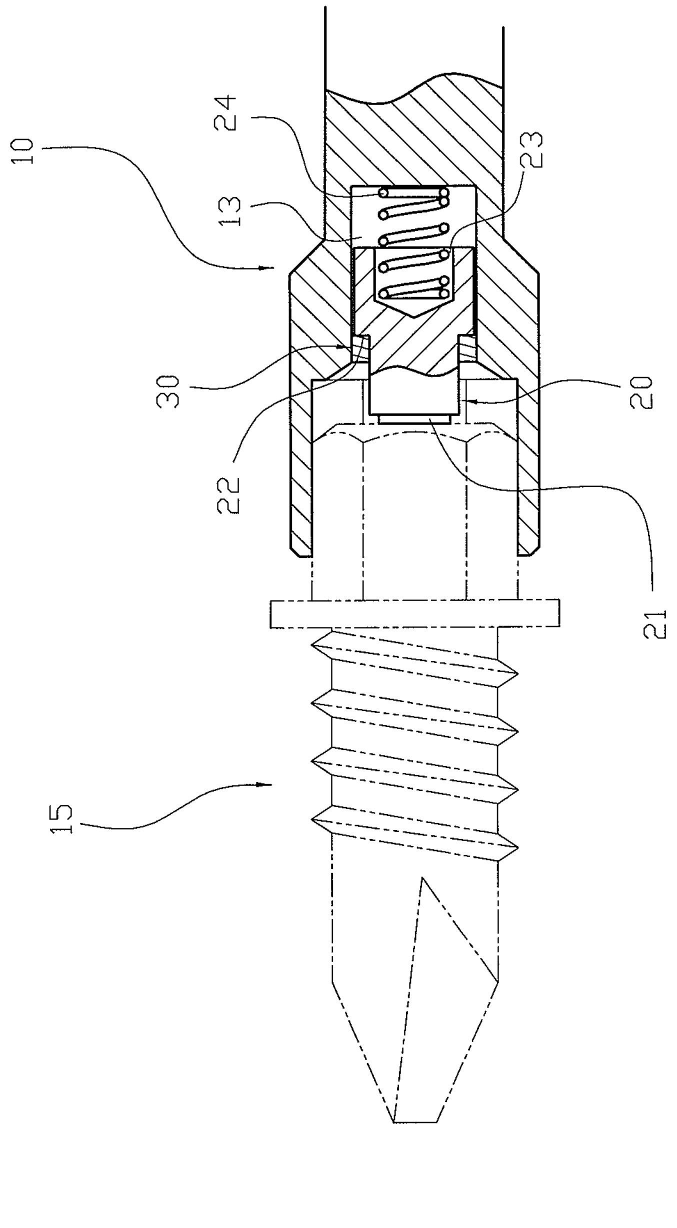
FIG. 4 is a schematic operational view of the driving device as shown in FIG. 3.
Figure 5:
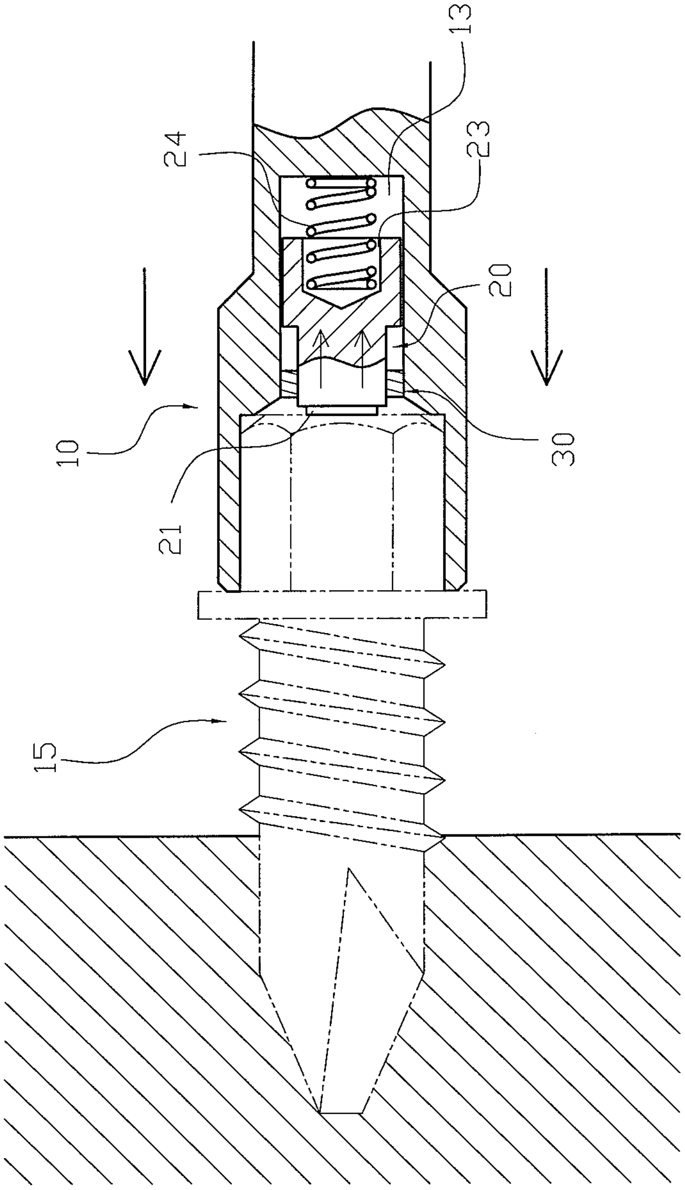
FIG. 5 is a schematic operational view of the driving device as shown in FIG. 4 in use.

In operation, referring to FIGS. 4 and 5 with reference to FIGS. 1-3, the mounting post 11 of the driving shank 10 is mounted on a driving tool, such as a motorized tool, pneumatic tool or hand tool, and the mounting hole 12 of the driving shank 10 is mounted on a driving member 15, such as a screwdriver tip, a drill bit and the like. At this time, the driving member 15 is magnetically attracted by the magnetic portion 21 of the magnetic member 20 so that the driving member 15 is secured in the mounting hole 12 of the driving shank 10 exactly. Thus, the driving member 15 is driven and operated by the driving tool. In such a manner, when the driving member 15 is pushed backward due to an reaction, the magnetic member 20 is pushed by the driving member 15 to retract into the receiving chamber 13 of the driving shank 10 and to compress the elastic member 24. Thus, the elastic member 24 provides a buffering effect to the magnetic member 20 to reduce the pressure applied on the magnetic member 20 so as to protect the magnetic member 20.

As shown in FIGS. 1-5, the driving shank 10 is a socket having a stepped shape.

Figure 6:
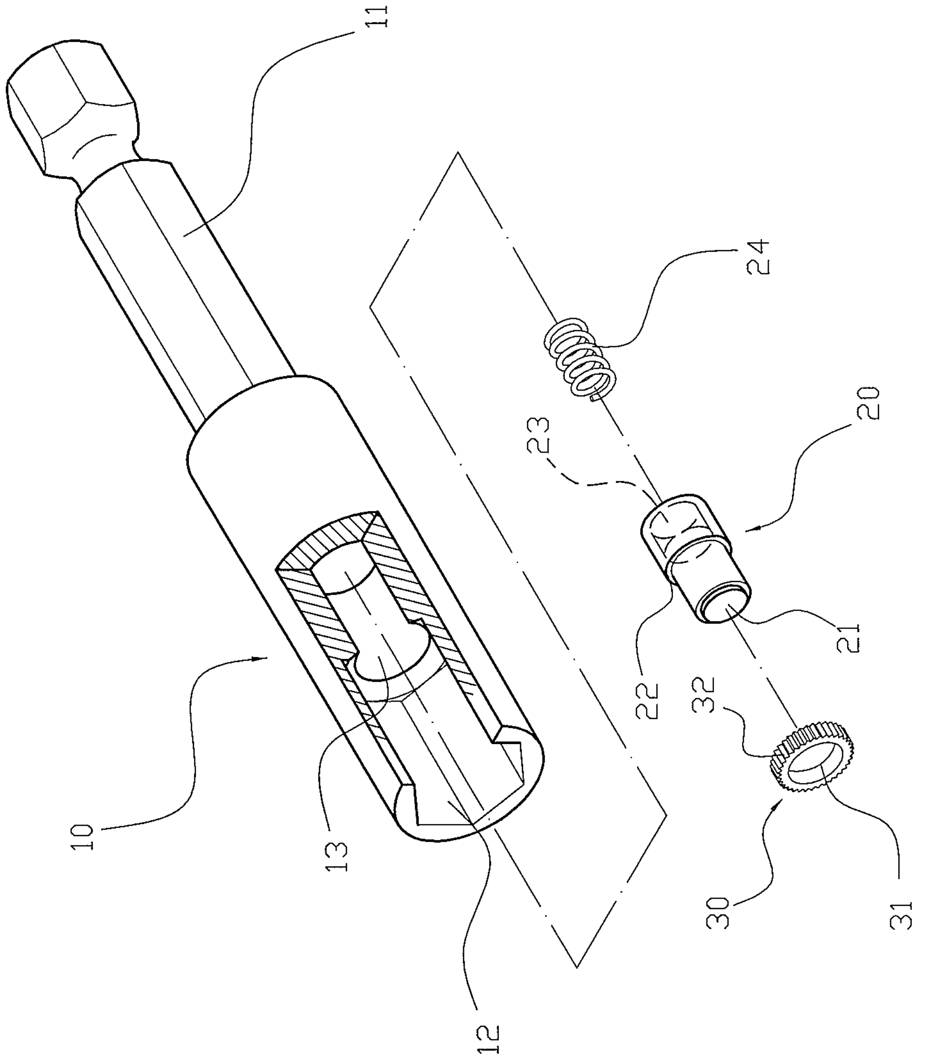
FIG. 6 is an exploded perspective view of a driving device in accordance with another preferred embodiment of the present invention.
Figure 7:
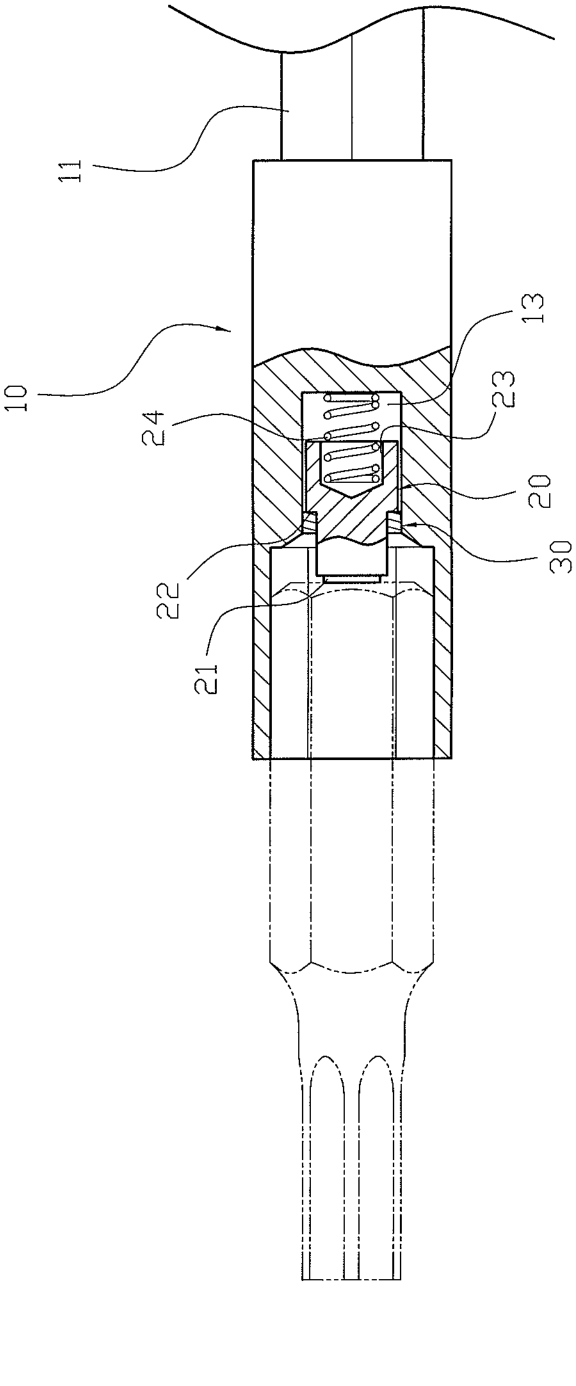
FIG. 7 is a front cross-sectional assembly view of the driving device as shown in FIG. 6.
Figure 8:
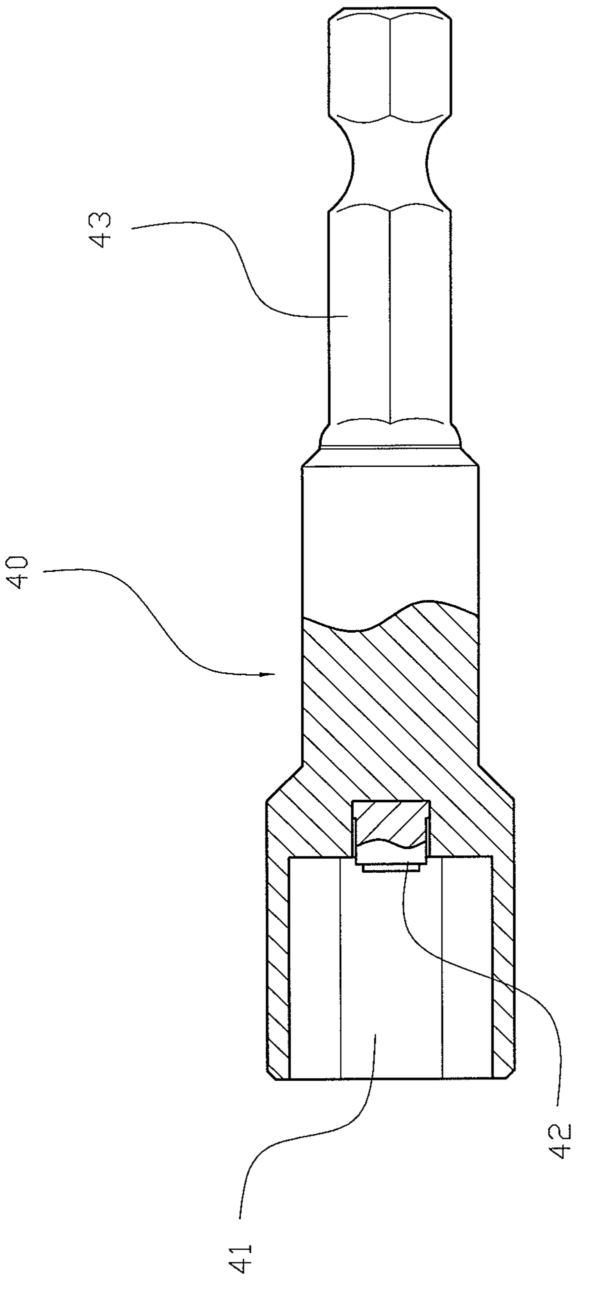
PRIOR ART FIG. 8
FIG. 8 is a partially front cross-sectional view of a conventional driving device in accordance with the prior art.
Figure 9:
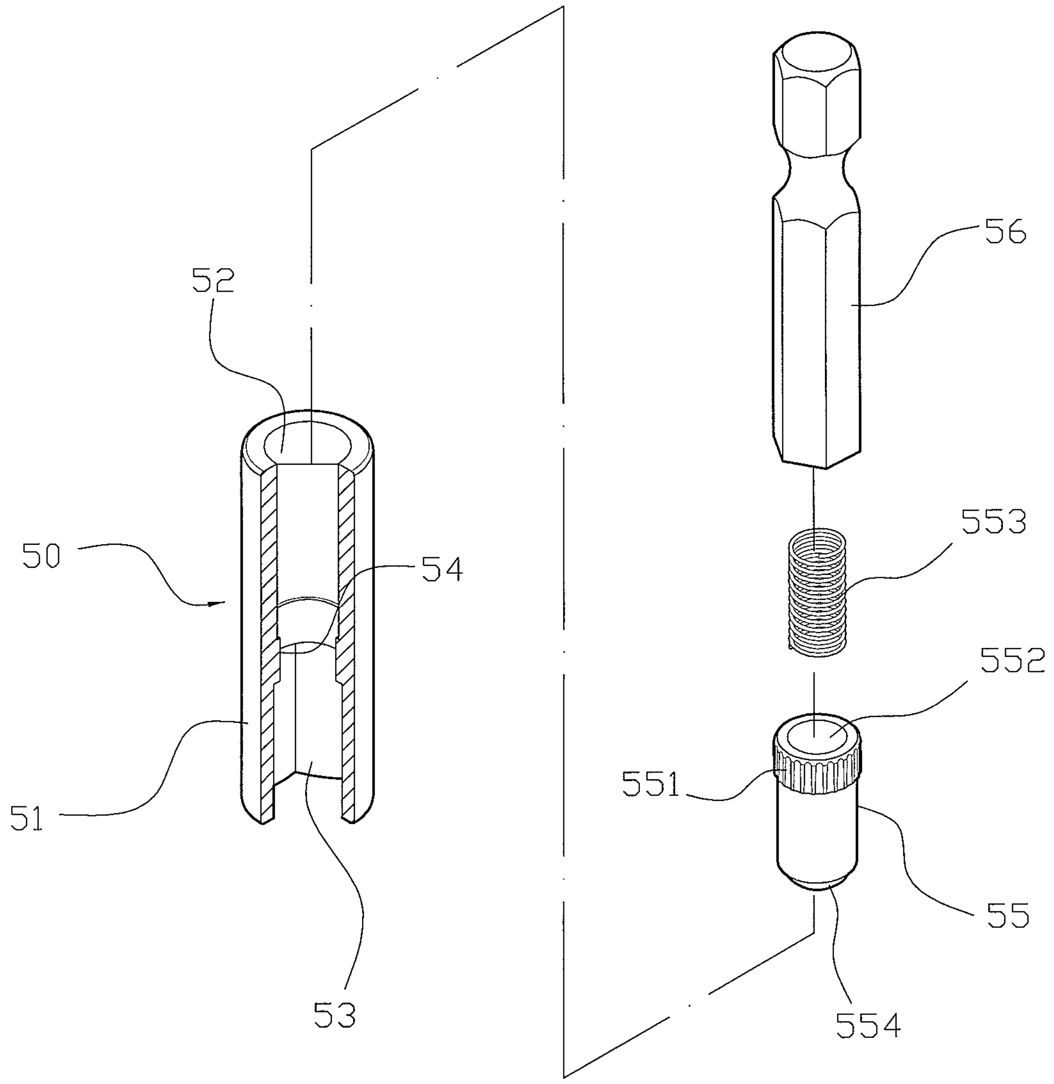
PRIOR ART FIG. 9
FIG. 9 is an exploded perspective view of another conventional driving device in accordance with the prior art.
Figure 10:
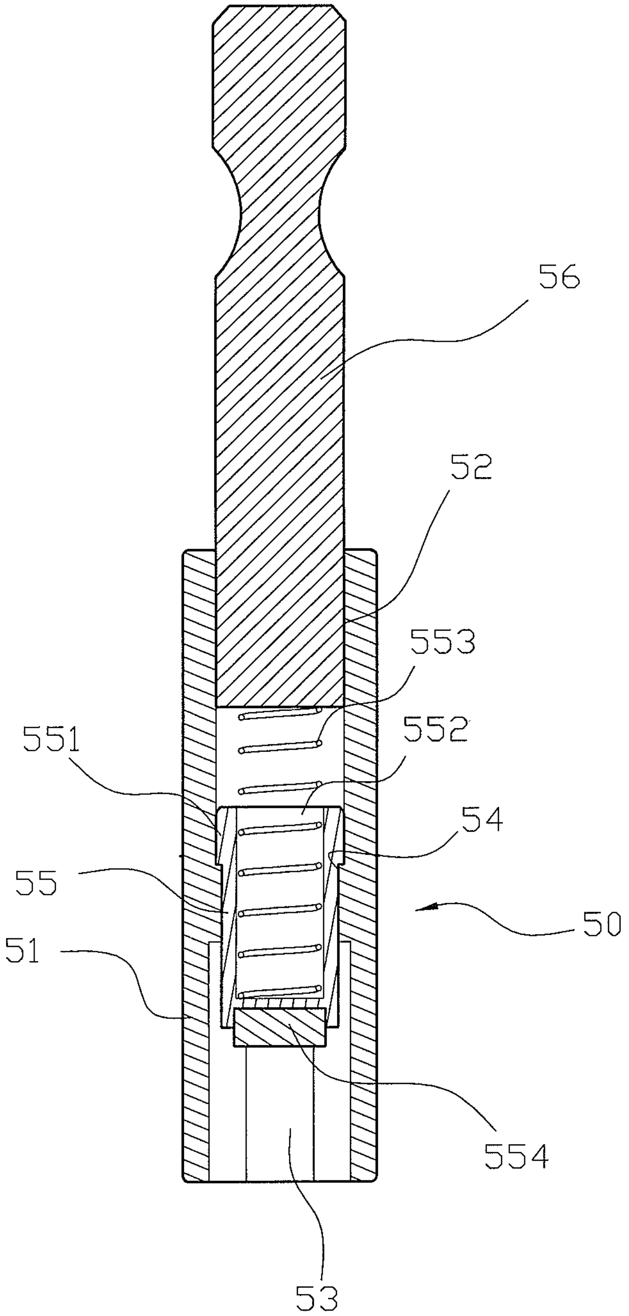
PRIOR ART FIG. 10
FIG. 10 is a front cross-sectional assembly view of the conventional driving device as shown in FIG. 9.
Figure 11:
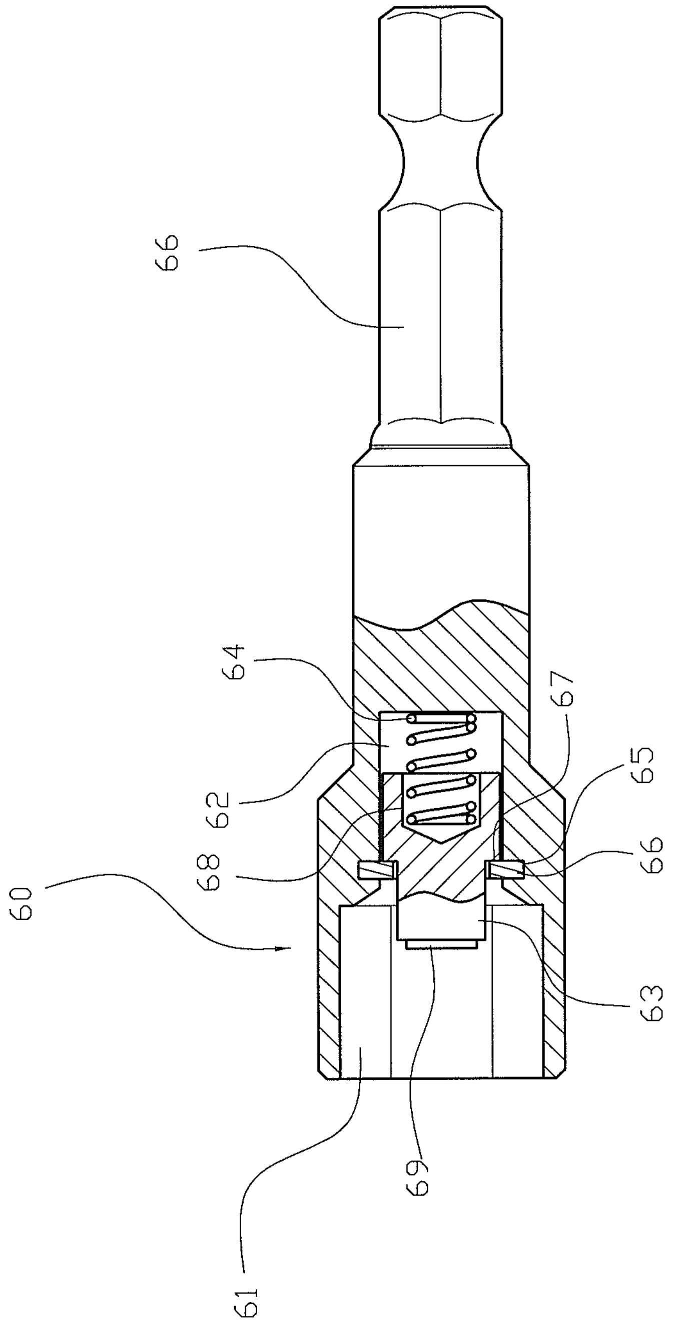
PRIOR ART FIG. 11
FIG. 11 is a front cross-sectional view of another conventional driving device in accordance with the prior art.

As shown in FIGS. 6 and 7, the driving shank 10 is an adapter or a connector having a constant outer diameter.

Accordingly, the elastic member 24 provides a buffering effect to the magnetic member 20 to reduce the pressure applied on the magnetic member 20 so as to protect the magnetic member 20 during operation of the driving shank 10. In addition, the driving shank 10 is formed with a receiving chamber 13, and the stop ring 30 is formed with a toothed portion 32 engaging the peripheral wall 14 of the receiving chamber 13 of the driving shank 10 so that the driving shank 10 and the stop ring 30 are worked easily and quickly to increase the productivity and to decrease the cost of fabrication. Further, the receiving chamber 13 of the driving shank 10 has a constant diameter without breaking the whole strength of the driving shank 10 so that the driving shank 10 has a greater structural strength.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A driving device, comprising:

a driving shank having a first end provided with a non-circular mounting post and a second end formed with a non-circular mounting hole and a receiving chamber connected to said mounting hole, wherein said receiving chamber of said driving shank has a size smaller than that of said mounting hole of the driving shank;

a magnetic member movably disposed at said receiving chamber, wherein said magnetic member has a first end disposed in said receiving chamber of the driving shank and a second end provided with a magnetic portion extended from said receiving chamber into said mounting hole of said driving shank, wherein said magnetic member further has a peripheral wall formed with a stepped stop flange between said first and second ends, wherein a diameter of said first end of said magnetic member is larger than a diameter of said second end;

a stop ring secured in the driving shank to stop the magnetic member, wherein said stop ring has a through hole and a toothed portion formed at a peripheral wall of said stop ring, wherein said tooth portion of said stop ring is engaged with a peripheral wall of said receiving chamber, wherein a diameter of said through hole is slightly larger than the diameter of said first end of said magnetic member to only allow said magnetic portion of said magnetic member sliding through said through hole, wherein a diameter of said stop flange is larger than the diameter of said through hole of said stop ring; and an elastic member mounted in said driving shank and biased between said driving shank and said magnetic member to push said magnetic member toward said stop ring at a position that said magnetic portion of said magnetic member is slidably passed through said through hole of said stop ring into said mounting hole until said stop flange of said magnetic member is blocked by said stop ring, wherein when said magnetic member is pushed backward, said elastic member is compressed for providing a buffering effect to said magnetic member.

2. The driving device, as recited in claim 1, wherein said magnetic member has a receiving space formed at said first end of said magnetic member, wherein said elastic member has a first end received in said receiving chamber and a second end received in said receiving space of said magnetic member.

3. The driving device, as recited claim 2, wherein said driving shank is a socket.

4. The driving device, as recited in claim 2, wherein said driving shank is an adapter or a connector.

* * * * *